United States Patent [19]

DelBiondo, II et al.

[11] Patent Number: 4,965,553

[45] Date of Patent: Oct. 23, 1990

[54] HAND-NEAR-MOUTH WARNING DEVICE

[76] Inventors: Thomas DelBiondo, II, 488 Whittier Ave., Plainedge, N.Y. 11756; Luis A. Tirado, Jr., 20 S. Lot Rd., Smithtown, N.Y. 11787

[21] Appl. No.: 344,220

[22] Filed: Apr. 27, 1989

[51] Int. Cl.[5] .................... G08B 21/00; G04B 47/00; G06F 15/00

[52] U.S. Cl. ............................ 340/573; 364/413.29; 364/705.07; 368/10; 340/686

[58] Field of Search ................ 340/573, 686; 368/10; 364/413.29, 705.07

[56] References Cited

U.S. PATENT DOCUMENTS

| | | | |
|---|---|---|---|
| 3,855,784 | 12/1974 | Foellner | 368/67 |
| 3,861,349 | 1/1975 | Conley | 116/114 R |
| 3,885,576 | 5/1975 | Symmes | 131/270 |
| 3,935,669 | 2/1976 | Potrzuski et al. | 200/61.45 R |
| 4,100,401 | 7/1978 | Tutt et al. | 377/49 |
| 4,101,071 | 7/1978 | Brejnik et al. | 377/49 |
| 4,159,416 | 6/1979 | Brejnik | 377/19 |
| 4,192,000 | 3/1980 | Lipsey | 272/93 |
| 4,212,079 | 7/1980 | Segar et al. | 364/900 |
| 4,282,412 | 8/1981 | Florin | 200/52 R |
| 4,291,301 | 9/1922 | Chan | 340/568 |
| 4,321,674 | 3/1982 | Krames et al. | 364/413 |
| 4,380,802 | 4/1983 | Segar et al. | 364/900 |
| 4,440,160 | 4/1984 | Fischell et al. | 128/419 S |
| 4,555,697 | 11/1985 | Thackrey | 340/575 |
| 4,557,275 | 12/1985 | Dempsey, Jr. | 340/573 |
| 4,855,942 | 8/1989 | Bianco | 368/10 |

*Primary Examiner*—Glen R. Swann, III

*Attorney, Agent, or Firm*—Nolte, Nolte & Hunter

[57] ABSTRACT

The apparatus includes a strap for wearing the apparatus on the wearer's wrist. A three-axis attitude sensor senses when the wrist in a position which places the hand near the wearer's mouth. An alarm is actuated by the three-axis sensor and warns the wearer that his hand is near his mouth. The apparatus is particularly suited for use with a calorie counter for counting calories consumed by the wearer during a given time period.

7 Claims, 6 Drawing Sheets

HAND-NEAR-MOUTH WARNING DEVICE

FIELD OF INVENTION

The present invention relates to a device for warning a wearer that his hand is near his mouth. More particularly, it relates to a device for warning a compulsive smoker or a compulsive eater that he is about to consume that which he is trying to avoid. In particular, it relates to a calorie-counter which reminds the wearer that the calories he is consuming should be entered in the counter.

BACKGROUND OF THE INVENTION

In the field of dieting, it is important for a dieter to know how many calories he is consuming. All other things being equal, the success of an attempt to lose weight depends heavily on the dieter's limiting of his calorie intake. It is therefore helpful for the dieter to know precisely how many calories he is consuming during the course of a day. Toward this end, a number of calorie counters have been described to enable a dieter to keep track of the calories he is consuming. Typically, such counters take the form of a wrist-watch, including a counter-circuit for entering a count indicative of caloric intake, and a display for displaying the number of calories which have been entered.

Examples of such calorie counters have been referred to in U.S. Pat. Nos. 4,100,401, issued July 11, 1978 to Tutt et al; 4,101,071, issued July 18, 1978 to Brejnik et al; and 4,159,416, issued July 26, 1979 to Brejnik et al.

Such calorie counters may function well and effectively as long as the dieter remembers to enter every caloric intake into the calorie counter. Unfortunately, however, most people with weight problems have compulsive habits which cause them to eat food habitually and without conscious awareness that they are doing so. Such a person may be totally engrossed in another task and may eat whatever happens to be within reach without even noticing that he is doing so. Since such a person does not notice he is eating, he naturally does not enter the calories he is consuming into the calorie counter. Such behavior defeats the ability of the calorie counter to accurately tally the number of calories being consumed. Thus, the counter will consistently display a low total caloric intake and deceive the dieter into thinking that he can afford to eat more than he should.

THE PRESENT INVENTION

The present invention seeks to overcome such behavior by providing a gentle reminder to the dieter whenever he is about to consume food. In a less sophisticated embodiment, the device can be a simple warning device without any counting function which will remind the wearer that he is engaging in undesired oral behavior. The apparatus would comprise a strap for wearing the apparatus on the wearer's wrist, a three-axis attitude sensor for sensing when the wrist is in a position which places the hand near the wearer's mouth, and an alarm for actuation by the three-axis sensor for warning the wearer that the hand is near the mouth. Thus, the device could be used to warn either eaters or smokers that their hand is approaching their mouth and that they are about to engage in activity which they are attempting to limit.

In this application, a term "three-axis" is defined as having its usual meaning of the two horizontal axes of length and width and a vertical axis. The term "three-axis" is used herein to describe any orthogonal three-axis system which describes the known three-dimensional spatial universe. Specifically, it is used herein to describe a sensor which is able to determine its three-dimensional angular orientation in relation to a gravitational field, such as the gravitational field acting upon the surface of the earth. Such a sensor is useful because it will actuate, if properly adjusted, when the hand of a human, erect upon the surface of the earth, is brought near the human's mouth.

In the more sophisticated embodiment, the warning device is combined with a counter for counting calories (or cigarettes) consumed by the wearer. Such a counter would comprise a strap for wearing on the wrist, a memory for registering calories consumed, an entry means such a number pad for entering calorie intakes into the memory, a three-axis attitude sensor for sensing when the wrist is in a position to place food or a cigarette in the wearer's mouth; and an alarm for actuation by the three-axis sensor which would warn the wearer that the wrist is in a position to place food in the wearer's mouth.

The device of the present invention is not necessarily intended to stop the wearer from eating or smoking, but may merely remind him that he should enter a record of his consumption into the counter. The counter will, whenever desired, display the number of calories or cigarettes which have been consumed during the day.

Such a counter can easily be combined with a wristwatch and a calculator. A calorie chart may be incorporated into the strap.

DETAILED DESCRIPTION OF THE DRAWINGS

Figure 1:
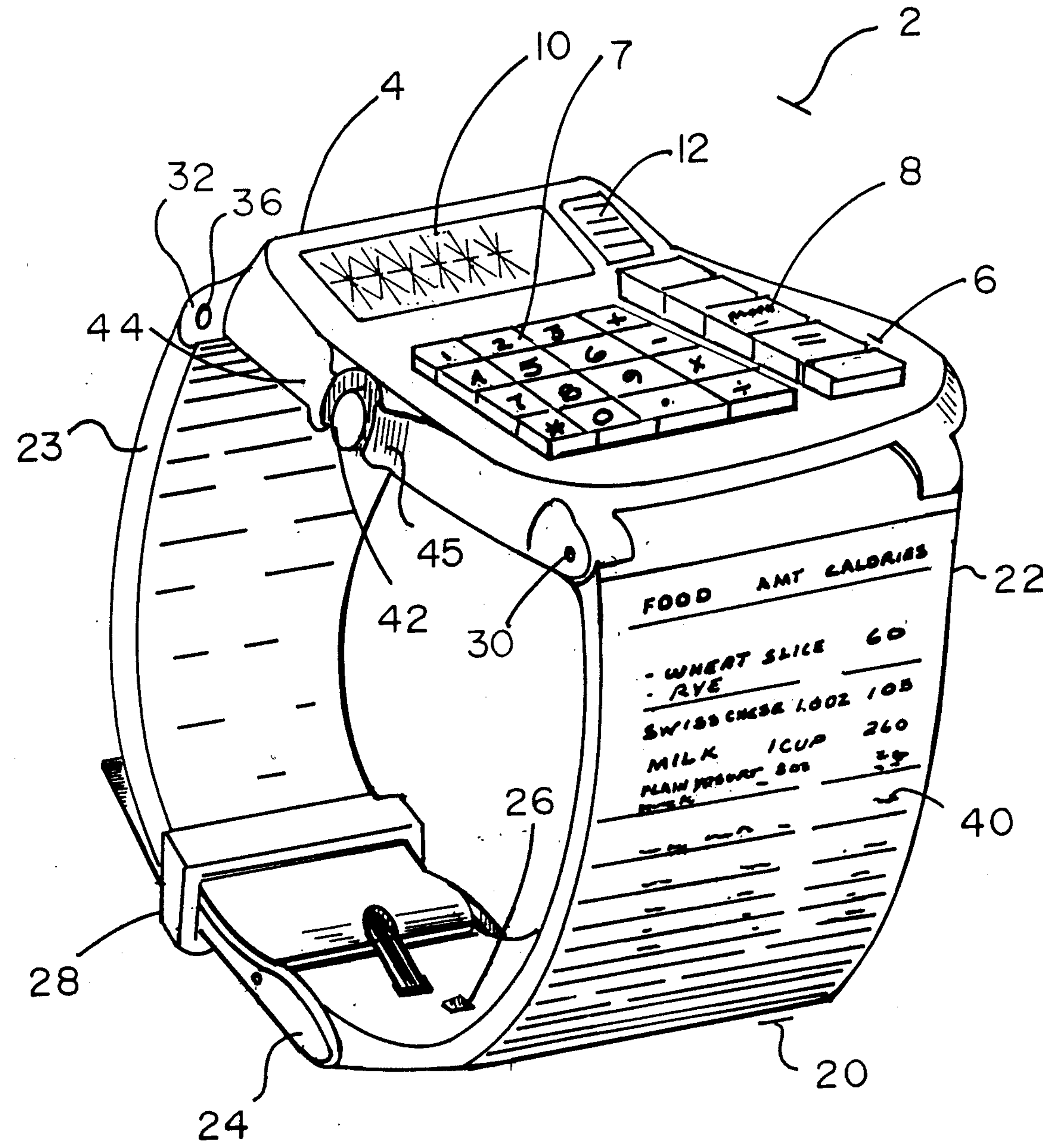
FIG. 1 is a perspective view of the calorie counter of the present invention.

FIG. 1 is a perspective view showing the calorie counter of the present invention, generally designated 2. The calorie counter apparatus comprises a housing 4, upon which is located a key pad 6. The key pad comprises number keys 7 and function keys 8. Above the key pad is a display 10 next to which is located alarm 12 such as a sound transducer which is capable of generating an audible sound. In more sophisticated versions, the sound transducer may be designed to radiate sound through the case without means of an opening in the case. Such an embodiment is shown in FIG. 2 and has the advantage of a larger area of the face which is available for display and function keys.

Strap means 20 conventionally comprises a pair of straps 22, 23, a buckle 24, holes in the strap such as 26, a strap retainer 28, a pair of telescoping rods 30, 32 which are mounted in holes 36 in housing 4 and extend through transverse holes not shown in straps 22, 23 to pivotally attach straps 22, 23 to housing 4. Strap 22 also comprises a calorie chart 40 printed or affixed thereto to aid the wearer in recalling the proper number of calories to enter when eating any of the more common foods.

Set-switch 42 is used for such functions as setting the time of day, or setting an alarm or count-down timer if provided, or for setting a daily calorie limit. Guards 44, 45 protrude to either side of switch 42 and protect it from accidentally being depressed. Since setting the above functions is not done frequently and would be annoying if done accidentally, such guards are helpful in preventing inadvertent resetting of these values. Switch 42 is generally depressed by a fingernail and is unlikely to be actuated accidentally.

Figure 2:
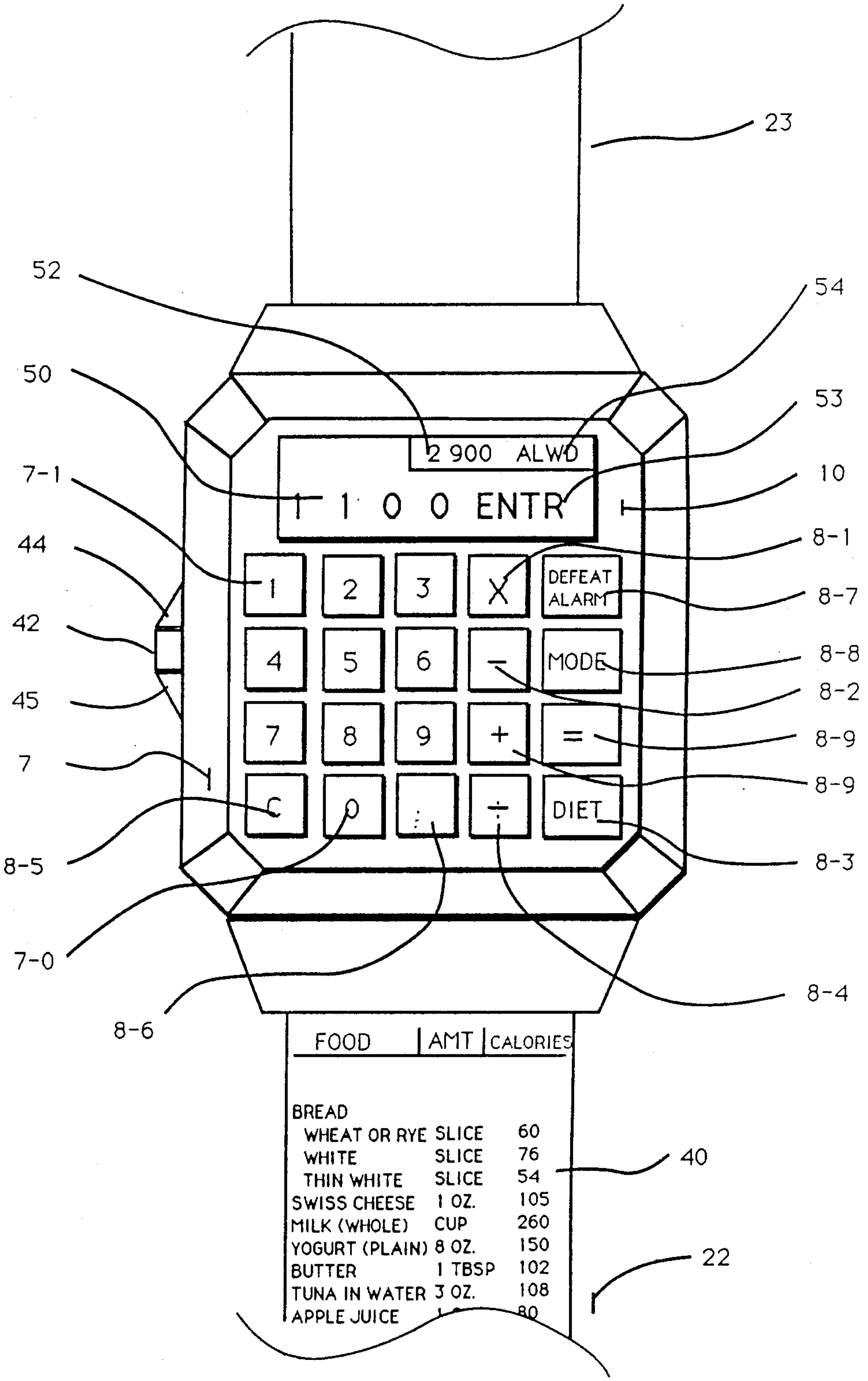
FIG. 2 is a plan view of the face thereof.

FIG. 2 identifies the nature of the display and of the function switches more clearly. Number switches 7-1 through 7-0 provide the means of entering calorie intakes into the memory means. Function keys 8-1 through 8-4 provide for arithmetic functions in the calculator mode and may be used to enter or delete calories from the tally of the number of calories already consumed during the day.

Clear-switch 8-5 is used to clear the display, to clear a previously entered number, or to clear a just-entered calorie intake which the wearer has decided not to eat because of its effect on his total of calories consumed during the day. Decimal point switch 8-6 is used to enter decimal points in the calculator mode. Switch 8-7 is used to defeat the alarm. That is, it turns off the alarm in the alarm or count-down timer modes and it turns off the hand-near-mouth alarm when the counter is in a diet mode.

Mode switch 8-8 selects through the various modes. The apparatus may have conventional watch modes. A time mode would display the time on primary display 50 and the date on secondary display 52. Other timer modes would display the time of day in the secondary display 52 while displaying alarm time, stop watch time, or count-down time in primary display 50. Time, count-down time and alarm time would be set in each of these modes by depressing set-switch 42 and entering the desired value through the key pad while the display 10 flashes. When the desired time is entered, it can be set by depressing set-switch 42 again. If an error has been made it could be cleared by depressing clear-switch 8-5 prior to depressing set-switch 42.

Diet modes are entered by depressing diet-switch 8-11.

A first diet mode would display the number of calories already consumed during a given twenty-four hour period, preferably midnight to midnight. Calories-already-consumed would be displayed in the primary display area 50, while calories-which-may-yet-be-consumed would be displayed in secondary display 52.

Depressing any of the number switches while in calories-already-consumed mode would shift the device into an enter-calorie-intake mode, which would display a number of calories being entered. Calories-being-entered, which will be added to the calories-already-consumed, are displayed in the primary display area 50 while the calories already consumed would move to the secondary display 52. If a mistake were made in entering the number of calories, it could be cleared using clear switch 8-5. When the desired calorie intake was properly entered and displayed on display 50, it could be entered into the calorie total by depressing equal-switch 8-9 or plus-switch 8-3. Primary display 50 would then display the new total calories already consumed today while secondary display 52 displays the remaining number of calories which may be consumed prior to the limit. The alarm would then be automatically deactivated for a short interval, such as fifteen minutes, to allow the wearer to eat the food whose calorie value he has just entered.

Mode switch 8-8 would advance the display through various diet modes, time modes, and calculator modes. Primary display indicator 53 and secondary display indicator 54 would indicate which function is being displayed at any given time. Some possible indicators could be:

"TIME" for time;
"ST W" for stop watch;
"TIMR" for count-down time;
"ALRM" for alarm;
"ATE" for calories-already-consumed;
"ALWD" for calories-which-may-yet-be-consumed;
"LIMT" for daily calorie limit; and
"ENTR" for calories being consumed as they are entered through the keypad.

Pressing set-switch 42 in a diet mode would cause the daily calorie limit to be displayed in a flashing fashion on primary display 53 with display indicator "limit" flashing. The limit may then be changed using the number-key pad 7. Errors could be cleared using clear-switch 8-5. When the proper new value is displayed, it could be set by again depressing set switch 42 with a fingernail.

In any mode, when the hand wearing the apparatus is moved toward the mouth, a three-axis sensor in the apparatus will sound an alarm and switch the counter into a display of the number of calories already consumed that day, i.e. a calories-already-consumed-today mode. Depressing any number switches will then display a new calorie intake as indicated above, automatically shifting into an enter-calorie-intake mode. If a particularly heavy workout is anticipated to consume a large number of calories, this consumption can be compensated for by shifting into the diet mode using diet switch 8-11, entering the number of calories to be burned using the number pad 7 and depressing minus switch 8-2 instead of equal switch 8-9.

At any time, the counter may be shifted into the diet mode by depressing diet switch 8-11. All other modes may be reached by depressing mode switch 8-8. Modes may include such conventional modes as a calculator, stop-watch, lap timer, count-down timer, alarm, military time, or game. The default display is time and date. The calculator mode is selected by the mode switch. The diet mode is selected by diet switch 8-11 or by bringing the hand near the mouth.

Figure 3:
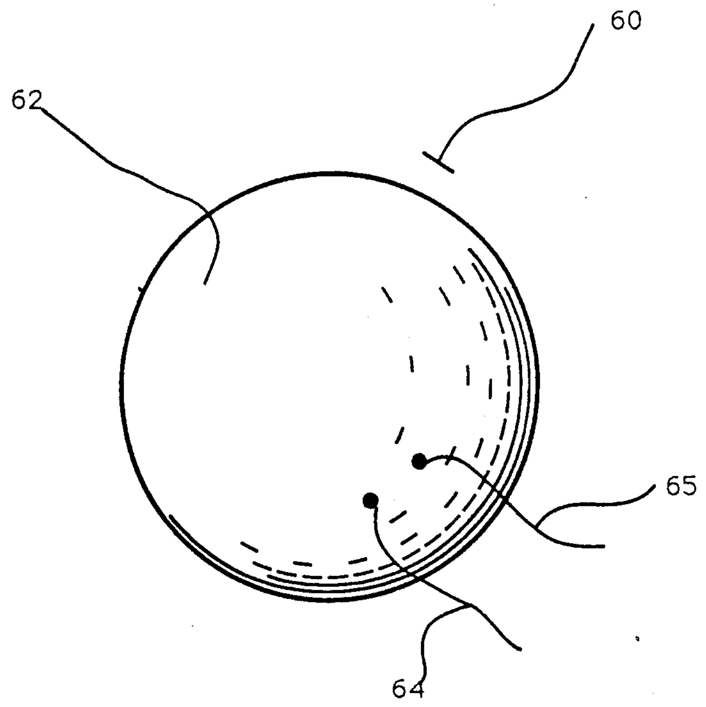
FIG. 3 is a view of the three-axis attitude sensor.
Figure 4:
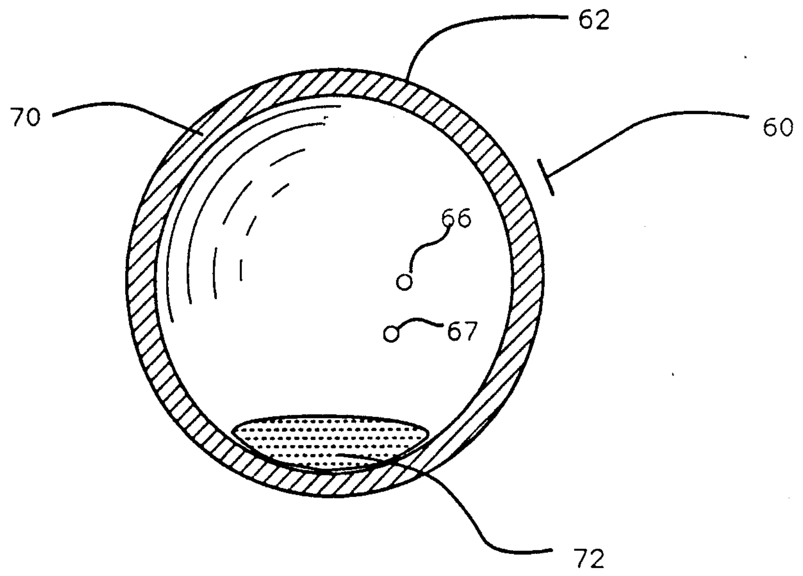
FIG. 4 is a sectional view thereof.

Located within housing 4 is three-axis sensor 60, shown in FIG. 3. This sensor comprises a hollow spherical housing 62 with a pair of conductors 64, 65 attached thereto. As shown in FIG. 4, housing 62 is formed by a spherical wall 70 shown in section in FIG. 4. Wall 70 forms a spherical internal cavity. Electrodes 66, 67 are located proximate to each other on the internal surface of wall 70. They are attached to conductors 64–65 [FIG. 3]. A blob of mercury 72 [FIG. 4] is contained by housing 62, and is free to flow around the internal surface of wall 70. At one three-dimensional attitude, when in a gravitational field such as that of the earth, the blob of mercury 72 will rest upon both electrodes 66, 67 and close a circuit between them, thus acting as a switch. Sensor 60 is so oriented that attitude occurs when a wrist of the wearer's eating hand or smoking hand is at the angle at which it places the wearer's hand adjacent his or her mouth.

It will be appreciated that this will be a different angle for left-handed and right-handed wearers. Thus, the watches will be manufactured for right-handed and left-handed wearers and the orientations of sensor 60 will be preset at the factory on the basis of empirical observation of the prototypes.

Alternatively, sensor 60 can be set in the housing with part of it accessible through an opening such as the battery access port. A set screw can be used to hold orientation of sensor 60 and the set screw can be loosened to adjust the orientation of sensor 60 to the individual wearer.

Figure 5:
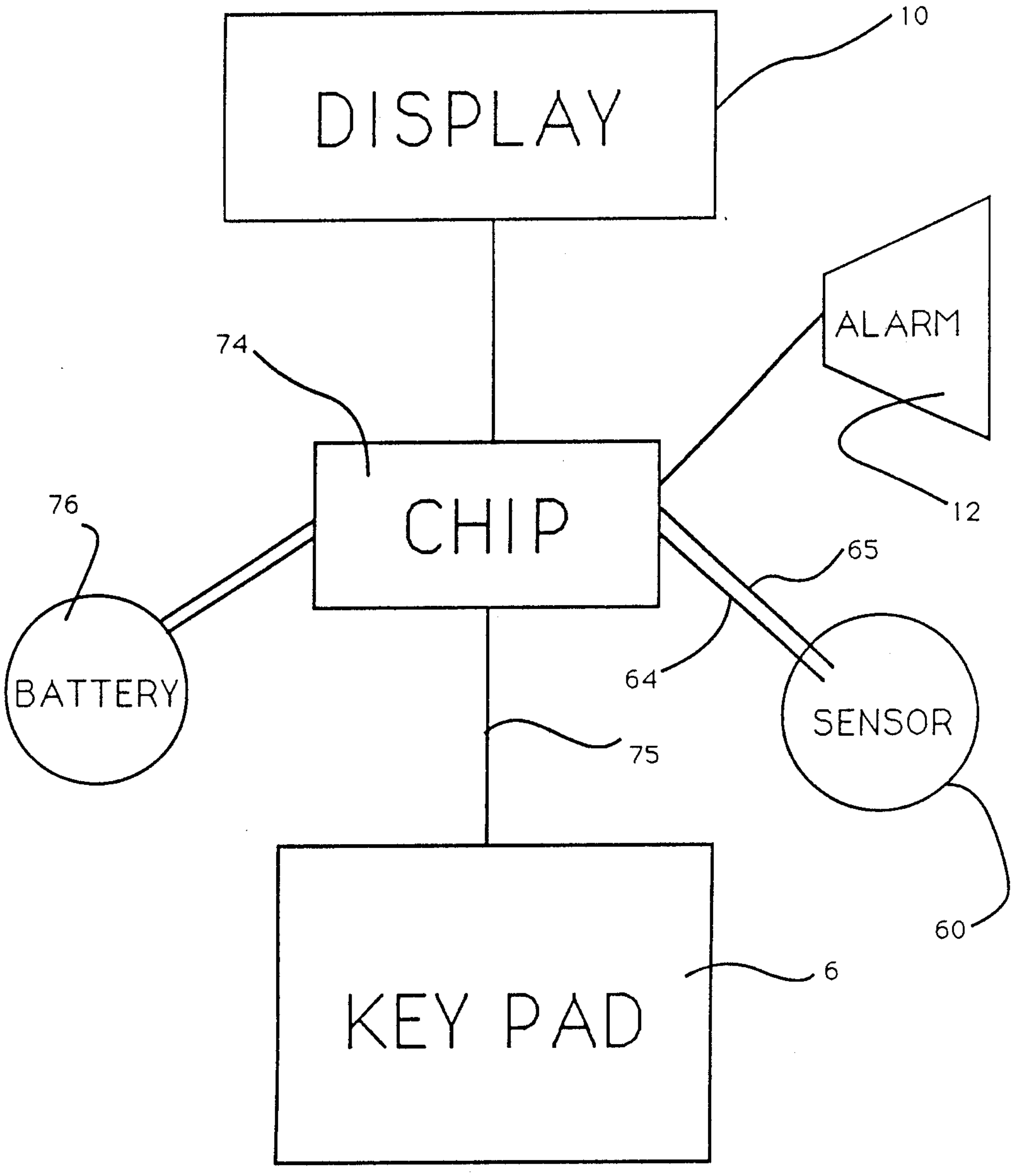
FIG. 5 is a block diagram of the elements of the apparatus.

FIG. 5 shows a block diagram of the functional elements of the present invention. Chip 74 is a watch calculator-type large-scale integrated circuit which has been pre-programmed to perform the functions as described above. It is connected by conductor means 75 to key pad 6 which controls inputs thereto as also described above. Battery 75 supplies power to the chip which uses it to sample signals from the keyboard and to display appropriate indications as described above on display 10. Sensor 60 is attached to chip 74 by means of conductors 64, 65. When the mercury blob closes the contacts of sensor 60, the short circuit is sensed by chip 74 which actuates alarm 12 and causes display 10 to indicate the number of calories already consumed for the day.

SIMPLIFIED WARNING DEVICE

Figure 6:
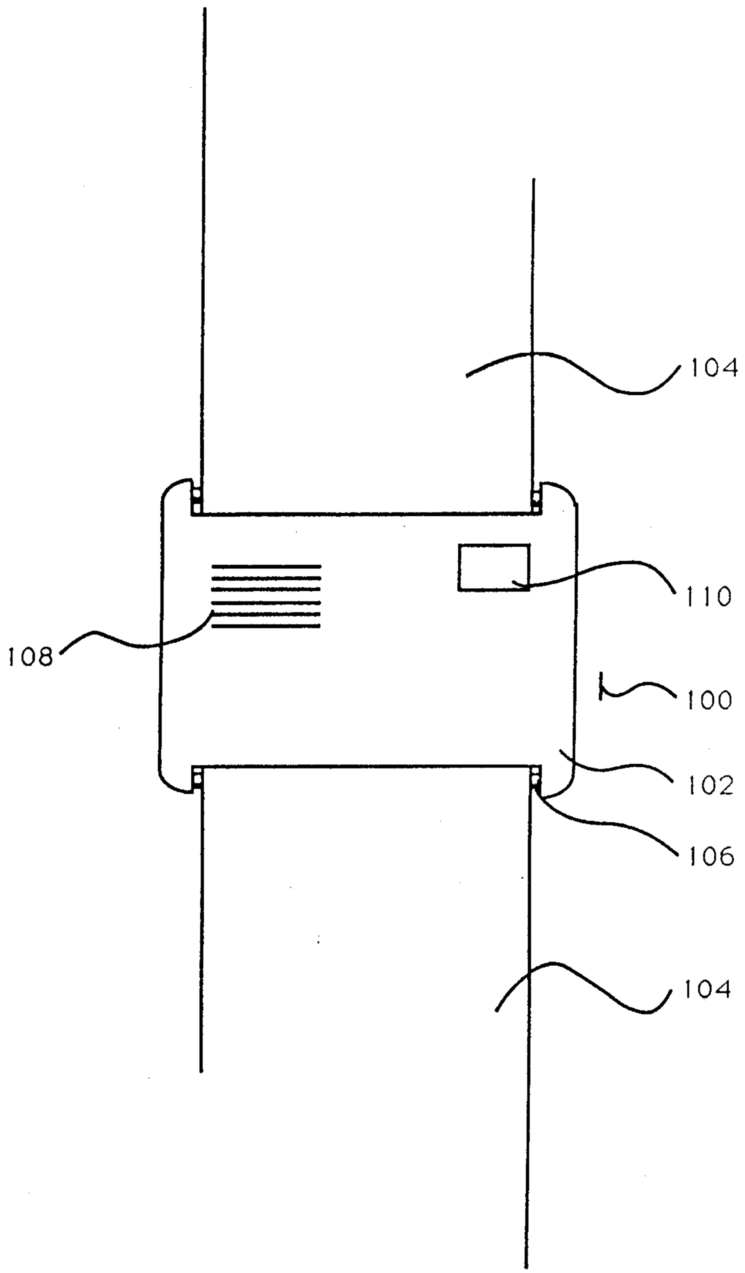
FIG. 6 is a view of a simplified alarm-only version of the apparatus.
Figure 7:
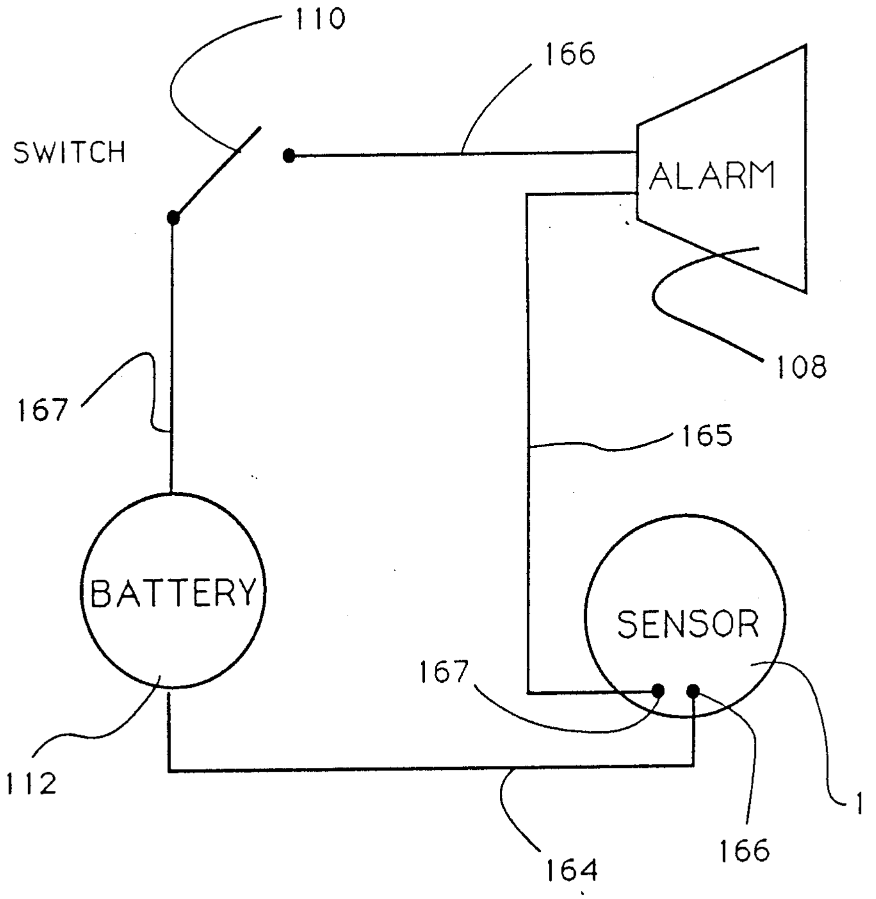
FIG. 7 is a block diagram thereof.

FIG. 6 shows a simplified version of the present invention. This version only provides the function of warning the wearer when his hand is near his mouth and is thus not as useful for providing a continuous calorie count. However, it is useful to remind the wearer that he is engaging in unconscious behavior, such as smoking or eating, which behavior he is attempting to limit. The apparatus, generally designated 100, comprises a housing 102 mounted upon a strap 104 by means of telescoping rods 106 as is conventional with wristwatches. The housing contains an alarm 108 and a switch 110. Switch 110 may be of a push-on/push-off variety or may be a rotary on/off switch such as a dial or lever. FIG. 7 shows the simplified circuit of this alarm which does not contain any integrated circuitry. Voltage and power are supplied by battery 112 through on/off switch 110. When switch 110 is closed, the circuit is armed. When the wearer raises his hand toward his mouth, his wrist achieves the attitude which causes the mercury to cover the electrodes 166, 167 and short the circuit between them. Thus the electricity can flow from battery 112 through conductor 164 across electrodes 166, 167 through conductor 165 to actuate alarm 108 which sounds an audible signal. Return flow is through conductors 166, switch 110 and conductor 167 to battery 112. When the user moves his hand from his mouth or opens switch 110, the alarm ceases.

Having thus described my invention, I claim:

1. Apparatus for warning a wearer when the wearer's hand is near his mouth, said apparatus comprising:
   - strap means for wearing the apparatus on the wearer's wrist;
   - three-axis attitude sensor means in the apparatus for sensing when the wrist is in a position which places the hand near the wearer's mouth;
   - alarm means, for actuation by the three-axis sensor means, for warning the wearer that the hand is near the mouth.

2. A calorie counter for counting calories consumed by the wearer, said counter comprising:
   - strap means for wearing the counter on a wrist;
   - memory means in the counter for registering calorie intakes;
   - entry means for entering calorie intakes into the memory means;
   - three-axis attitude sensor means for sensing when the wrist is in a position to place food in the wearer's mouth; and
   - alarm means, for actuation by the three-axis sensor means, for warning the wearer that the wrist is in a position to place food in the wearer's mouth.

3. Apparatus according to claim 2 comprising display means for displaying the number of calories consumed during the day.

4. Apparatus according to claim 3 in which the display means is also means for displaying:
   - a daily calorie limit;
   - a calorie intake as it is entered; and
   - a difference between the daily calorie limit and the number of calories already consumed during the day.

5. Apparatus according to claim 4 comprising watch means for telling time.

6. Apparatus according to claim 5 comprising switch means for changing modes of operation, said modes comprising:
   - a diet mode; and
   - a watch mode.

7. Apparatus according to claim 6, having means for automatically switching to the diet mode upon actuation of the sensor means.

* * * * *